(No Model.) 2 Sheets—Sheet 2.
P. BROWN.
CAR COUPLING.
No. 466,219. Patented Dec. 29, 1891.
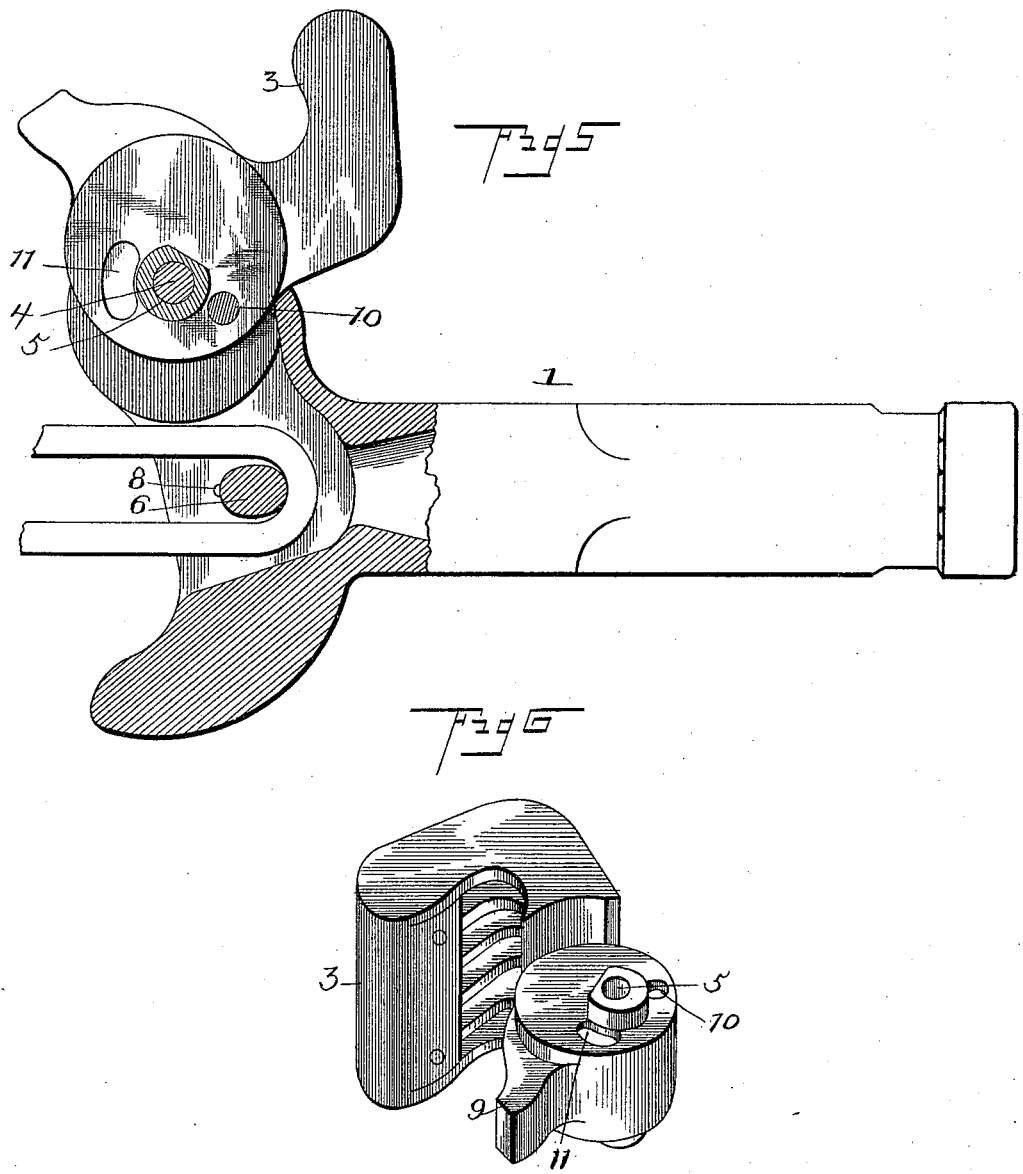
Witnesses
John Imirie
T. E. Robertson
Inventor
Perry Brown
By his Attorney
T. J. W. Robertson

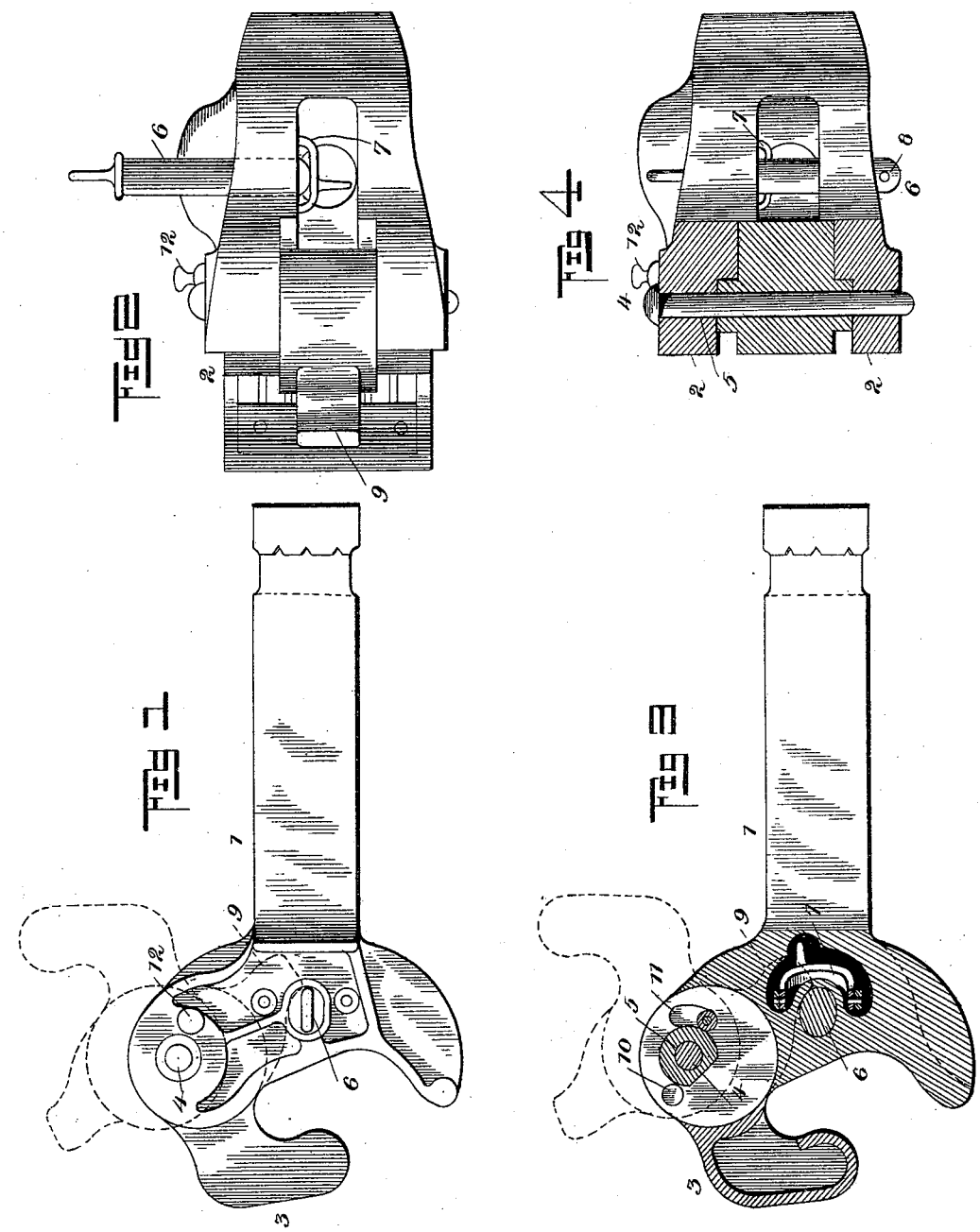

UNITED STATES PATENT OFFICE.

PERRY BROWN, OF SHARONVILLE, OHIO.

CAR-COUPLING.

SPECIFICATION forming part of Letters Patent No. 466,219, dated December 29, 1891.

Application filed April 18, 1891. Serial No. 389,435. (No model.)

*To all whom it may concern:*

Be it known that I, PERRY BROWN, a citizen of the United States, residing at Sharonville, in the county of Hamilton and State of Ohio, have invented certain new and useful Improvements in Car-Couplings, of which the following is a specification, reference being had therein to the accompanying drawings.

This improvement relates to that style of couplers shown in my patent, No. 461,312, dated October 13, 1891, Serial No. 375,295, filed December 20, 1890.

Its objects, briefly stated, are to simplify the construction and at the same time strengthen the parts; and the invention consists in the peculiar construction, arrangements, and combinations of parts hereinafter more particularly described, and then definitely claimed.

In the accompanying drawings, Figure 1 shows a plan of a coupler constructed according to my present improvement, as when in use with another clutch-coupler, and with the clutch in a different position in dotted lines. Fig. 2 is a front view of the same with the clutch thrown back and the pin raised ready to couple with an ordinary link. Fig. 3 is a similar plan to Fig. 1 with part broken away. Fig. 4 is a front view, partly in section, with the clutch closed, as in Fig. 1. Fig. 5 shows a plan of the coupling as used with a link and with part broken away. Fig. 6 shows a perspective view of the clutch detached.

Referring now to the details of the drawings by figures, 1 represents the draw-bar, having ears 2 cast therewith, between which is secured the clutch 3, which I prefer to term the "eccentric clutch," as the pin 4, which forms its pivot, passes through a hole 5, bored eccentrically to the center or body of the knuckle-joint, for a purpose hereinafter explained.

6 indicates a coupling-pin, and 7 a swinging detent, essentially the same as that shown in my aforesaid application, except that the coupling-pin has a small stop-pin 8 set in the front of its lower end, where it is always out of the way of the link, instead of being set in the side of the pin, as is usual. This coupling-pin 6 and detent 7 can be used in precisely the same way as in my aforesaid specification in coupling with a link, and the pin can also be used to lock the clutch as it drops down before the arm 9 of the clutch 3 when said clutch is closed in the coupling position. So it will be seen that this pin 6 has a double use—that of the ordinary coupling-pin and as the lock for the clutch. The top of the knuckle of the clutch has two small holes in it 10 and 11, adapted to receive a stop-pin 12, to hold the clutch in different positions. The hole 10 is used when the clutch is thrown back, as shown in Fig. 5, and the hole 11 is used when the clutch is in position to be used in coupling with another clutch, the hole 11 being made of such size as will allow the clutch 3 to swing open sufficiently to receive the clutch of another coupler and then allow said clutch 3 to close when pushed in by the other draw-bar. It will be seen that the holes through the knuckle of the clutch and the ears are bored eccentrically, which is one of the essential features of my invention, as it not only gives immense strength to the clutch at a part where it, as usually made, has proved weak under the enormous strain to which it is frequently subjected, but it leaves a much larger opening for the insertion of a link when coupling with an ordinary coupling. The greatest strain is at the place indicated by the dotted lines in Fig. 6, where there is a tendency to tear the metal apart. By making the hole eccentrically, as shown, I put the major part of the metal of the knuckle where it will do the most good, and thus the clutch is very much strengthened at its usually weakest point; but besides this strengthening of the clutch I have the further advantage of leaving plenty of room for the insertion of a link when the clutch is thrown back, as in Fig. 5, because when the pivotal pin is set eccentrically through the knuckle and the clutch is thrown back, as shown in said Fig. 5, the narrowest part of the knuckle is inside, and thus there is plenty of room for the entrance of the link, no matter how large it may be, within reasonable limits. It will be seen, also, that the hubs of the clutch and the recesses in which they turn are set eccentrically, so that in case the pivotal pin was broken and the strain should come on the hubs the strain on the metal of the ears would come on the thickest part thereof. By this construction I have the further advantage of broadening the wearing-surface of the joint or knuckle, whereby the rapid wearing of said joint and the pivotal pin is prevented, which soon wears out the ordinary clutch-coupling, rendering it useless in a comparatively short time.

It will be seen that the acting face of my clutch is formed of two semicircular curves, the outer being convex and the inner one concave, and that both of these curved parts are outside of the knuckle, and ears by which the wear of the latter is prevented, because there is a tendency for the convex part of one coupling to work into the concave part of the other, so that the two parts will always tend to keep their normal positions, and thus prevent the noses from wearing away the ears, which would be difficult to replace, while the clutches can be readily replaced when worn.

What I claim as new is—

1. A car-coupler having a swinging clutch with a substantially circular knuckle and an eccentrically-placed pivot, as set forth.

2. In a car-coupler, a swinging clutch having a substantially circular knuckle and with its joint bored eccentrically, substantially as set forth.

3. In a car-coupler, a swinging clutch having a substantially circular knuckle, provided with eccentric hubs, substantially as set forth.

4. In a car-coupler, a swinging clutch with a substantially circular knuckle, and a pivoted pin set eccentrically therein and in the ears of the knuckles, substantially as set forth.

5. A car-coupler having a pin for coupling with a link, and a swinging clutch constructed to be locked by said link-coupling pin, substantially as described.

6. A car-coupler having a swinging clutch provided with a substantially circular knuckle having hubs surrounding the pivotal center and set in eccentric recesses in the ears, whereby the strain from said link is brought on the widest part of the metal of the ears, substantially as described.

7. A car-coupler having a swinging clutch provided with holes 10 and 11, and a pin 12, engaging therein to hold the clutch in different positions, substantially as described.

8. In a twin-jaw car-coupler, the combination of a draw-bar, a pin adapted to couple with a link, and a clutch having an arm swinging in the path of the coupling-pin, substantially as described.

9. In a car-coupler, the combination of a draw-bar, a coupling-pin, and a detent for supporting the same, with a swinging clutch having an arm swinging under the detent and throwing it backward, substantially as described.

In testimony whereof I affix my signature, in presence of two witnesses, this 17th day of April, 1891.

PERRY BROWN.

Witnesses:
T. J. W. ROBERTSON,
T. E. ROBERTSON.